US012620749B2

(12) United States Patent
Kuo et al.

(10) Patent No.: US 12,620,749 B2
(45) Date of Patent: May 5, 2026

(54) CABLE CONNECTOR AND METAL HOUSING THEREOF

(71) Applicant: ACES ELECTRONICS CO., LTD., Taoyuan (TW)

(72) Inventors: Rong-Hsun Kuo, Taoyuan (TW); Chang-Ho Teng, Taoyuan (TW)

(73) Assignee: ACES ELECTRONICS CO., LTD., Taoyuan City (TW)

( * ) Notice: Subject to any disclaimer, the term of this patent is extended or adjusted under 35 U.S.C. 154(b) by 408 days.

(21) Appl. No.: 18/337,772

(22) Filed: Jun. 20, 2023

(65) Prior Publication Data

US 2024/0145980 A1 May 2, 2024

(51) Int. Cl.

| | |
|---|---|
| ***H01R 13/508*** | (2006.01) |
| ***H01R 13/6582*** | (2011.01) |
| ***H01R 13/6598*** | (2011.01) |
| ***H01R 43/20*** | (2006.01) |

(52) U.S. Cl.

CPC ....... *H01R 13/508* (2013.01); *H01R 13/6582* (2013.01); *H01R 13/6598* (2013.01); *H01R 43/20* (2013.01)

(58) Field of Classification Search

CPC .............. H01R 13/508; H01R 13/6582; H01R 13/6598; H01R 43/20; H01R 13/65918; H01R 13/6592; H01R 2103/00

See application file for complete search history.

(56) References Cited

U.S. PATENT DOCUMENTS

| | | | | |
|---|---|---|---|---|
| 6,254,430 | B1 * | 7/2001 | Endo | H01R 9/05 439/578 |
| 6,406,303 | B1 * | 6/2002 | Kosmala | H01R 24/44 439/604 |
| 7,422,480 | B1 * | 9/2008 | Musick | H01R 9/0518 439/879 |
| 10,122,129 | B2 * | 11/2018 | Milbrand, Jr. | H01R 43/20 |
| 2021/0057854 | A1 * | 2/2021 | Droesbeke | H01R 9/0518 |
| 2023/0046887 | A1 * | 2/2023 | Swanger | H01R 13/6592 |
| 2025/0266651 | A1 * | 8/2025 | Tian | H01R 24/40 |

FOREIGN PATENT DOCUMENTS

| | | | |
|---|---|---|---|
| FR | 3074614 A1 * | 6/2019 | H01R 9/0518 |

* cited by examiner

*Primary Examiner* — Travis S Chambers

(74) *Attorney, Agent, or Firm* — MUNCY, GEISSLER, OLDS & LOWE, P.C.

(57) ABSTRACT

A cable connector includes a metal housing, an insulator, and a cable. The metal housing includes a sleeve end, a main body, and a plug end integrally formed from rear to front. The plug end includes an end body having a plurality of holes formed therethrough, a ring portion extending forward from the end body, and a plurality of elastic elements extending backward from the ring portion. The cable is accommodated in the metal housing and fixed to the insulator. Therefore, by the metal housing integrally formed, the manufacturing steps and the assembly steps of the cable connector are simplified. Furthermore, by the design that each elastic element extends backward from the ring portion, the deformation of each elastic element due to the excessive stress during plugging is avoided.

19 Claims, 10 Drawing Sheets

CABLE CONNECTOR AND METAL HOUSING THEREOF

CROSS-REFERENCE TO RELATED APPLICATIONS

This application is based upon and claims priority under 35 U.S.C. 119 from Taiwan Patent Application No. 111140737 filed on Oct. 26, 2022, which is hereby specifically incorporated herein by this reference thereto.

BACKGROUND OF THE INVENTION

1. Field of the Invention

The present invention is related to an electrical connector, more particularly to a cable connector and metal housing thereof.

2. Description of the Prior Arts

With reference to FIGS. 10A and 10B, a conventional cable connector includes an outer housing 5, an insulator 6, and a cable 7. The outer shell 5 includes a first housing 51 and a second housing 52 that are independent of each other. The first housing 51 includes a front portion 511 and a rear portion 512. The front portion 511 includes a ring portion 513 and a plurality of elastic elements 514. The ring portion 513 and the elastic elements 514 integrally extend forward from the front portion 511. A distal end of each elastic element 514 is close to the ring portion 513. The insulator 6 is accommodated in the first housing 51 and a part of the second housing 52. A front end of the insulator 6 is located at a back side of the ring portion 513 of the first housing 51. The cable 7 is disposed through a rear end of the second housing 52. The cable 7 has a core wire 70 disposed through and fixed to the insulator 6.

The first housing 51 and the second housing 52 are combined to form the outer housing 5 of the conventional cable connector. Therefore, the two-piece first and second housings 51 and 52 need to be manufactured separately, assembled as the outer housing 5 by an additional step thereafter, and then made into the conventional cable connector. An assembling step of the conventional cable connector is complicated. Additionally, after the outer housing 5 has been plugged and unplugged many times, the first and second housings 51 and 52 may be separated from each other. Furthermore, an extending direction of each elastic element 514 is the same as a plugging direction of the conventional cable connector. Thus, during the plugging process, if the cable connector deviates from the correct plugging direction, the distal ends of the elastic elements 514 close to the ring portion 513 directly bear the stress of the deviated cable connector. The elastic elements 514 may be overstressed and be bent and deformed.

To overcome the shortcomings of the conventional cable connector, the present invention provides a cable connector and a metal housing thereof to mitigate or obviate the aforementioned problems.

SUMMARY OF THE INVENTION

An objective of the present invention is to provide a cable connector and metal housing thereof.

To achieve the objection as mentioned above, the cable connector includes:

- a metal housing including a sleeve end, a main body, and a plug end from rear to front and integrally formed, wherein the plug end includes:
  - an end body having a ring portion extending forward from the end body and a plurality of holes formed through the end body; and
  - a plurality of elastic elements respectively corresponding to the holes and integrally extending backward from the ring portion of the end body;
- an insulator matchingly accommodated in the main body and the end body of the plug end of the metal housing and having two inner conductor terminals disposed through the insulator from front to rear; and
- a cable including:
  - an insulation jacket matchingly mounted in the sleeve end; and
  - two inner conductors protruding from the insulation jacket and mounted in the insulator to be respectively connected to the two inner conductor terminals.

With the foregoing description, the cable connector applies the metal housing integrally formed, and the metal housing is designed for the insulator to be matchingly accommodated in the main body of the metal housing and the end body of the plug end. Furthermore, the cable is mounted in the metal housing, and the two inner conductors are respectively connected to the inner conductor terminals and are fixed to the insulator. Moreover, each elastic element of the plug end extends backward from the ring portion of the end body. Additionally, the extending direction of the elastic elements is opposite to the plugging direction of the cable connector, and the distal end of each elastic element is away from the ring portion. Therefore, an excessive stress generated while the plugging direction of the cable connector deviates does not act on the distal end of each elastic element. Accordingly, the manufacturing steps and the assembling steps of the integrally formed metal housing in accordance with the present invention are simplified. Furthermore, after the cable connector has been plugged and unplugged many times, the metal housing does not disintegrate. Moreover, by the design that each elastic element extends backward from the ring portion, the excessive stress that acts on the elastic elements during plugging may be further avoided, and the deformation of the elastic elements is prevented.

To achieve the objection as mentioned above, the metal housing of the cable connector includes a sleeve end, a main body, and a plug end from rear to front and integrally formed, wherein the plug end includes:

- an end body having a ring portion extending from the end body and a plurality of holes formed through the end body; and
- a plurality of elastic elements respectively corresponding to the holes and integrally extending backward from the ring portion of the end body.

With the foregoing description, the metal housing is integrally formed and is designed for a cable connector to apply. Furthermore, the extending direction of the elastic elements is opposite to the plugging direction of the cable connector, and the distal end of each elastic element is away from the ring portion. Therefore, an excessive stress generated while the plugging direction of the cable connector deviates does not act on the distal end of each elastic element. Accordingly, the manufacturing steps and the assembling steps of the integrally formed metal housing in accordance with the present invention may be simplified. Furthermore, after the cable connector has been plugged and unplugged many times, the metal housing does not disintegrate. Moreover, by the design that each elastic element extends backward from the ring portion, the excessive stress that acts on the elastic elements during plugging may be further avoided and the deformation of the elastic elements is prevented.

DETAILED DESCRIPTION OF THE EMBODIMENTS

With multiple embodiments and drawings thereof, the features of the present invention are described in detail as follows.

Figure 1:
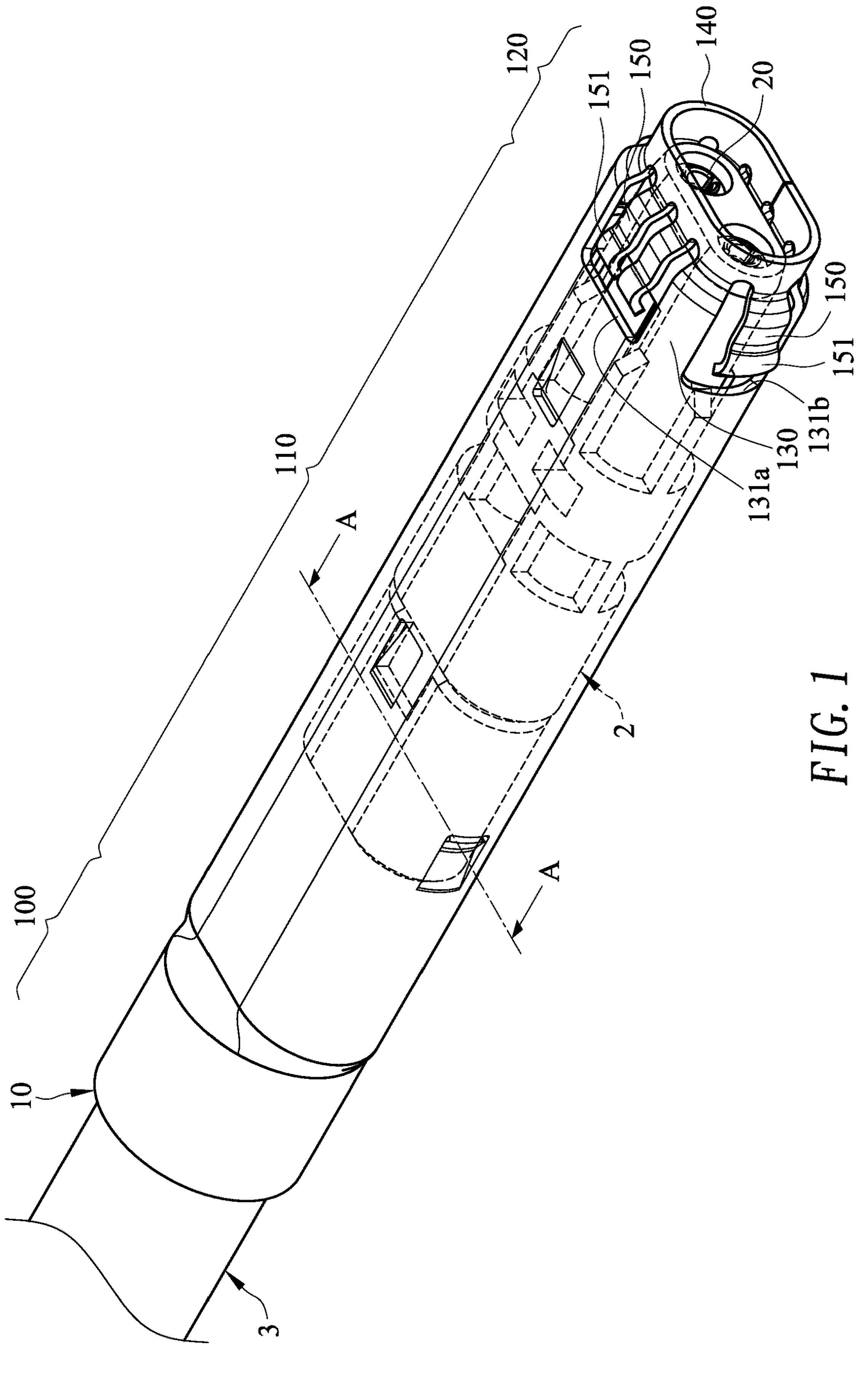
FIG. 1 is a perspective view of a first embodiment of a cable connector in accordance with the present invention.
Figure 2:
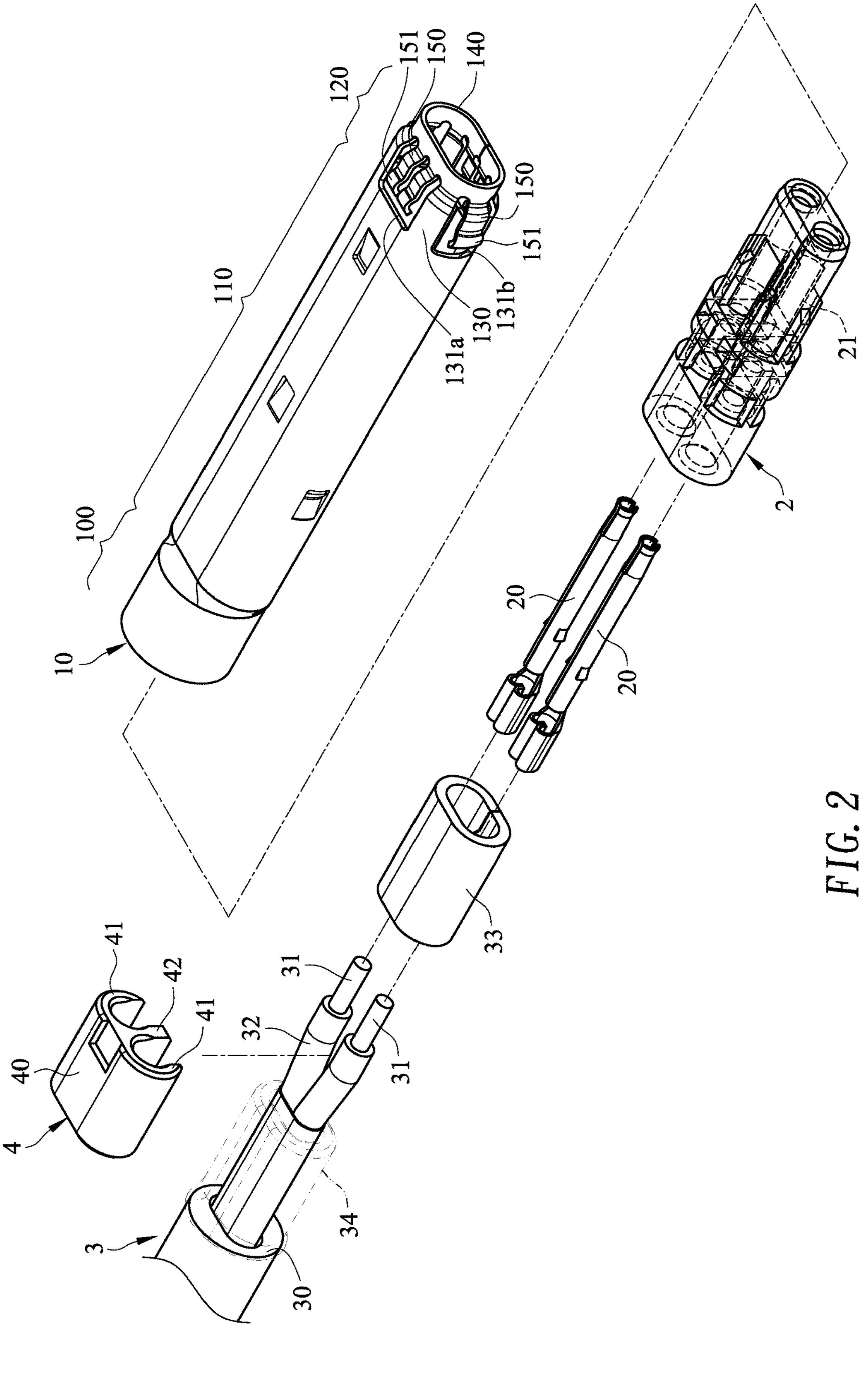
FIG. 2 is an exploded perspective view of FIG. 1.

With reference to FIGS. 1 and 2, a first embodiment of the cable connector in accordance with the present invention is shown. The cable connector includes a metal housing 10, a first insulator 2, and a cable 3 and an optional metal shielding element 4. The cable 3 is fixed to the first insulator 2. The first insulator 2 is matchingly accommodated in the metal housing 10 together with the cable 3.

Figure 4:
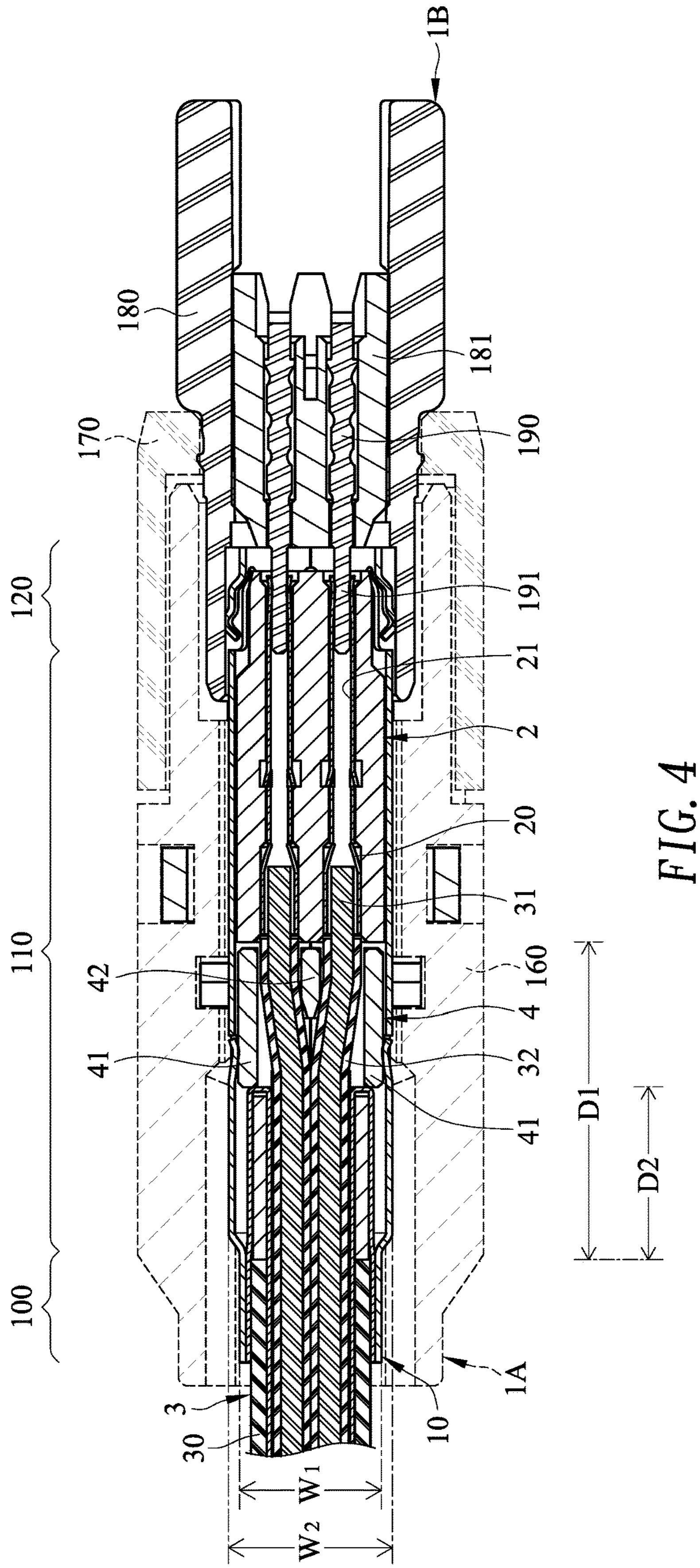
FIG. 4 is another operational side view in partial section of the cable connector shown of FIG. 1 under a plugging state.

The metal housing 10 includes a sleeve end 100, a main body 110, and a plug end 120 from rear to front and integrally formed. In one embodiment, the sleeve end 100 may be tubular and has a maximum width. With further reference to FIG. 4, the sleeve end 100 matches the cable 3 and may be cylindrical. The maximum width W1 of the sleeve end 100 is defined by an outer diameter thereof.

Figure 5:
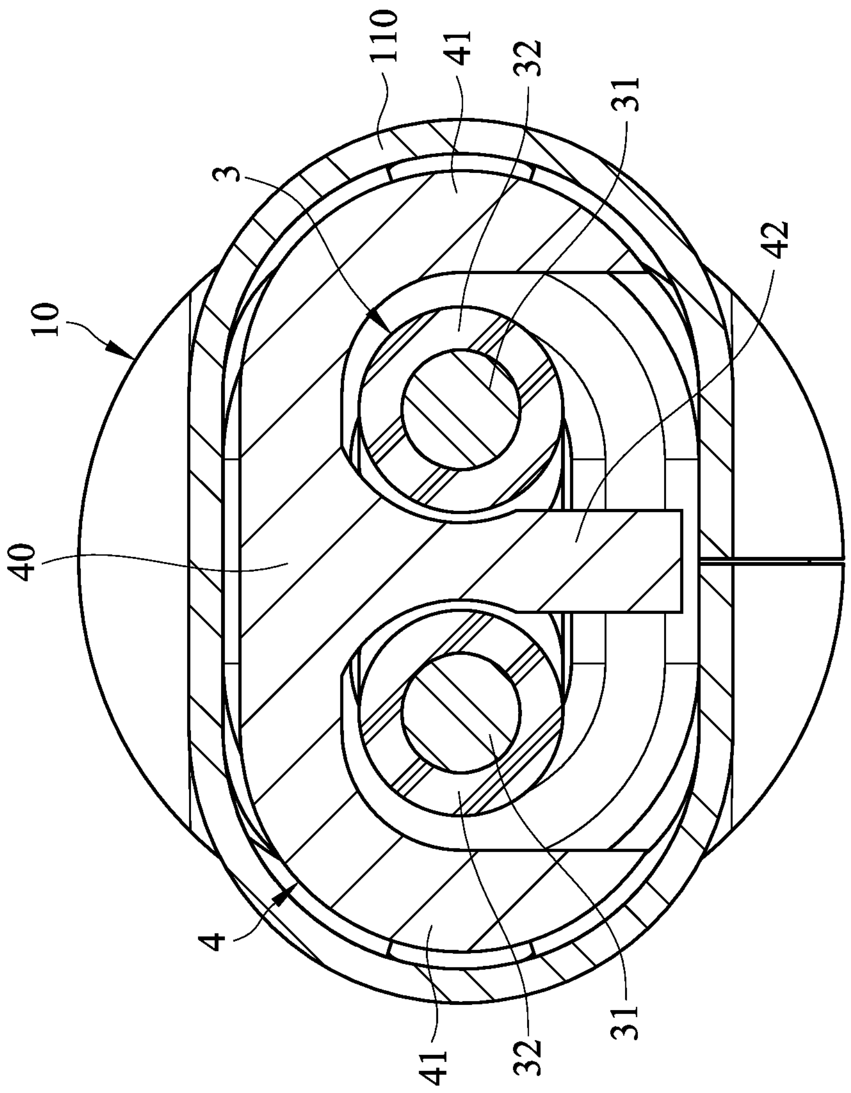
FIG. 5 is a cross-sectional view along the A-A line in FIG. 1.

In the present embodiment, the main body 110 of the metal housing 10 may be a long-oval cylinder and has a maximum width, but the main body 110 is not limited to the long-oval cylinder. Therefore, as shown in FIG. 5, a shape of a vertical cross-section of the main body 110 may be long-oval. The main body 110 has two opposite sidewalls. The maximum width of the main body 110 is defined by a maximum distance between two outer surfaces of the sidewalls of the main body 110. Additionally, as shown in FIG. 4, the maximum width W2 of the main body 110 may be greater than the maximum width W1 of the sleeve end 100.

Figure 3:
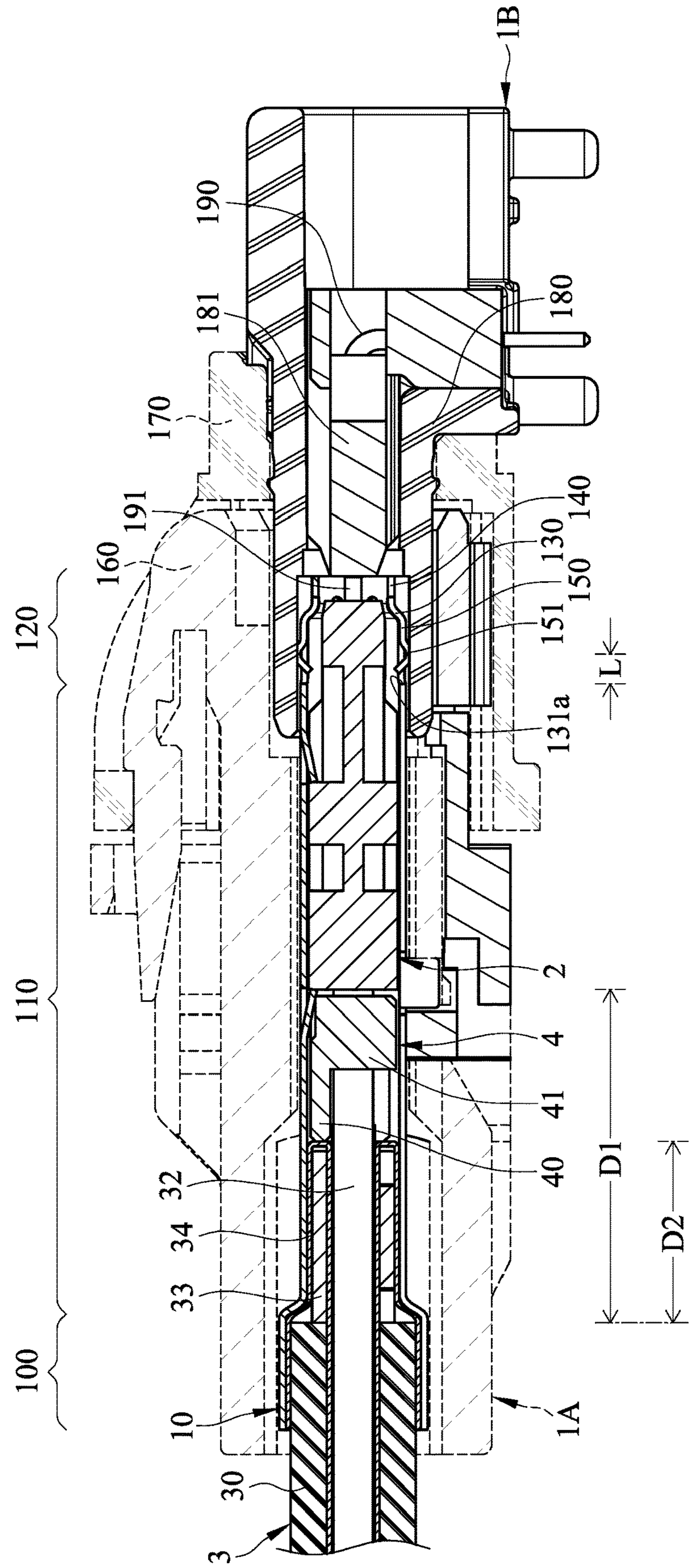
FIG. 3 is an operational side view in partial section of the cable connector shown of FIG. 1 under a plugging state.

The plug end 120 of the metal housing 10 includes an end body 130 and a plurality of elastic elements 150. The end body 130 has a ring portion 140 and a plurality of first and second holes 131*a*, 131*b*. In one embodiment, the ring portion extends forward from the end body 130. In the present embodiment, the ring portion 140 extends forward and inward from the end body 130. The first and second holes 131*a*, 131*b* are formed through the end body 130. In the present embodiment, the end body 130 may be a long-oval cylinder which is the same as that of the main body 110 and has a top wall, a bottom wall, and two opposite sidewalls. Two first holes 131*a* are respectively formed through the top wall and bottom wall of the end body 130. Two second holes 131*b* are respectively formed through the two sidewalls of the end body 130. As shown in FIGS. 1 and 2, a width of each first hole 131*a* may be greater than a width of each second hole 131*b*, but is not limited thereto. The elastic elements 150 correspond to the first and second holes 131*a* and 131*b* and extend backward from the ring portion 140. Thus, the extending direction of the elastic elements 150 is opposite to the plugging direction of the cable connector. A distal end of each elastic element 150 is away from the ring portion 140. As shown in FIGS. 1 and 2, two of the elastic elements 150 are separated from each other, correspond to the wider first hole 131*a* formed through the top wall of the end body 130, and extend backward from a top wall of the ring portion 140. Another two of the elastic elements 150 are separated from each other, correspond to the wider first hole 131*a* formed through the bottom wall of the end body 130, and extend backward from a bottom wall of the ring portion 140. The other two of the elastic elements 150 respectively correspond to the narrower two second holes 131*b* respectively formed through the two sidewalls of the end body 130 and extend backward from two sidewalls of the ring portion 140. The amount and the position of the elastic elements 150 are not limited to the amount and the position thereof as described above. Each elastic element 150 has a convex portion 151 extending outward from the distal end of the corresponding elastic element 150 and protruding out of the metal housing 10. The convex portion 151 may be arc-shaped. Furthermore, as shown in FIG. 3, a distance L is defined between the convex portion 151 and an inner wall of the corresponding first hole 131*a* away from the ring portion 140. In the present embodiment, the distance L may be 1 mm but is not limited thereto. A maximum width of the plug end 120 may match a maximum width of the main body 110. Specifically, a maximum width of the end body 130 of the plug end 120 may match the maximum width of the main body 110.

The first insulator 2 is matchingly accommodated in the main body 110 of the metal housing 10 and the end body 130 of the plug end 120. Two inner conductor terminals 20 disposed through the first insulator 2 from front to rear. Each inner conductor terminal 20 may be hollow. In one embodiment, the first insulator 2 may include two accommodating channels 21 formed through the first insulator 2 from front to rear. The inner conductor terminals 20 are respectively disposed through and accommodated in the accommodating channels 21.

With reference to FIGS. 2 and 3, a first lateral distance D1 is defined between the cable 3 and the first insulator 2. The cable 3 includes an insulation jacket 30 and two inner conductors 31. The insulation jacket 30 is matchingly mounted in the sleeve end 100 of the main body 10. In one embodiment, the two inner conductors 31 protrude forward from a front end of the insulation jacket 30. A part of the two inner conductors 31 is not mounted in the first insulator 2 at the first lateral distance D1. In the present embodiment, the two inner conductors 31 protrude forward from the front end of the insulation jacket 30 to the main body 110 of the metal housing 10. The two inner conductors 31 are mounted in the first insulator 2 to be respectively connected to the two inner conductor terminals 20.

With reference to FIGS. 2, 3, and 4, the cable 3 may further include two dielectric layers 32, a cable sleeve 33, and an outer conductor 34. As shown in FIGS. 2 and 4, the two dielectric layers 32 expose from the insulation jacket 30 and extend forward from the insulation jacket 30. The two dielectric layers 32 are disposed in the main body 110 of the metal housing 10 and respectively coat on the part of the two inner conductors 31, which is not mounted in the first insulator 2 at the first lateral distance D1. To make the two inner conductors 31 be insulated to each other, the material of the two dielectric layers 32 may be insulated material. The cable sleeve 33 is matchingly accommodated in the main body 110 of the metal housing 10 and is located between the first insulator 2 and the cable 3 to be mounted around the two dielectric layers 32. In the present embodiment, a distance is defined between the cable sleeve 33 and the first Insulator 2. The cable sleeve 33 is close to the insulation jacket 30. The cable sleeve 33 clamps the two dielectric layers 32 protruding from the insulation jacket 30 so that the two dielectric layers 32 are side by side in the cable sleeve 33. The outer conductor 34 has a first part and a second part integrally connected to each other. The first part of the outer conductor 34 is located between the two dielectric layers 32 and the insulation jacket 30 and between the two dielectric layers 32 and the cable sleeve 33. As shown in FIGS. 2 to 4, the second part of the outer conductor 34 extends forward from the cable sleeve 33 and then is bent outward and backward along the cable sleeve 33 in the main body 110 of the metal housing 10 to be mounted around the cable sleeve 33. In other words, the second section of the outer conductor 34 is located between the cable sleeve 33 and the main body 110 and between the insulation jacket 30 and the sleeve end 100. In the present embodiment, the outer conductor 34 may be a metal mesh and is electrically connected to the metal housing 10. Therefore, the noise signals and the electromagnetic interference are electrically grounded through the outer conductor 34 and conducted away from the cable connector.

With reference to FIGS. 3 and 4, the metal shielding element 4 is matchingly accommodated in the main body 110 of the metal housing 10. A second lateral distance D2 is defined between the metal shielding element 4 and the cable 3. The metal shielding element 4 is located between the first insulator 2 and the cable sleeve 33 of the cable 3 and includes a top plate 40, two side plates 41, and a divider 42 integrally formed. The top plate 40 is located between an upper side of the two dielectric layers 32 and the top wall of the main body 110. The two side plates 41 extend downward from two opposite sides of the top plate 40 and are respectively located between outer sides of the two dielectric layers 32 and the sidewalls of the main body 110. The divider 42 protrudes downward from the top plate 40 and is located between the two dielectric layers 32 to divide the two dielectric layers 32. Thus, the cable sleeve 33 of the cable 3 may be mounted around a part of the two dielectric layers 32, which is not divided by the metal shielding element 4 at the second lateral distance D2. In the present embodiment, the metal shielding element 4 may be a zinc alloy die casting, which may block the electromagnetic interference. Therefore, the efficiency of the cable connector for the high-frequency signal transmission is improved.

With reference to FIGS. 3 and 4, the cable connector of the present invention may be matchingly mounted in a first plastic housing 160 to be assembled as a cable-end connector 1A. A board-end connector 1B corresponding to the cable-end connector 1A may include a second plastic housing 170, a board-end housing 180, a second insulator 181, and two pillar terminals 190. The board-end housing 180 is matchingly mounted in the second plastic housing 170. The second insulator 181 is matchingly accommodated in the board-end housing 180. The two pillar terminals 190 correspond to the two inner conductor terminals 20 of the first insulator 2 of the cable-end connector 1A and are disposed through and fixed to the second insulator 181. Each pillar terminal 190 has an end 191 protruding from the second insulator 181. In FIGS. 3 and 4, the cable-end connector 1A is plugged into the board-end connector 1B. The first and second plastic housing 160 and 170 are fixed to each other and do not separate from each other. The plug end 120 and a front portion of the main body 110 of the metal housing of the cable-end connector 1A are plugged into and accommodated in the board-end housing 180 of the board-end connector 1B. The convex portions 151 of the elastic elements 150 are abutted against inner walls of the board-end housing 180. Thus, the metal housing 10 and the board-end housing 180 are further connected to each other. The ends 191 of the two pillar terminals 190 are respectively plugged into and contact with the two inner conductors 20 to further carry out the electrical communication and the signal transmission.

Figure 6:
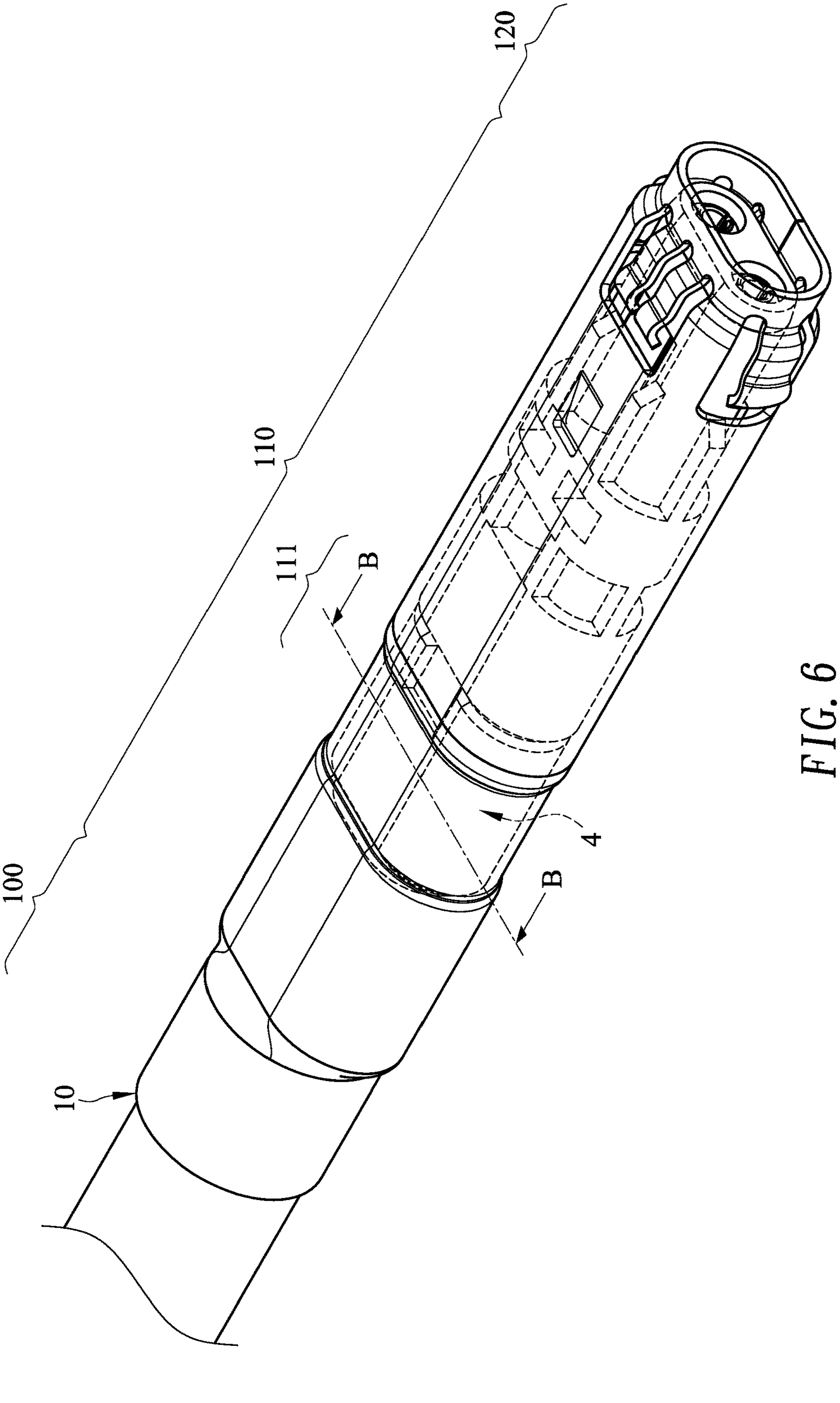
FIG. 6 is a perspective view of a second embodiment of the cable connector in accordance with the present invention.
Figure 7:
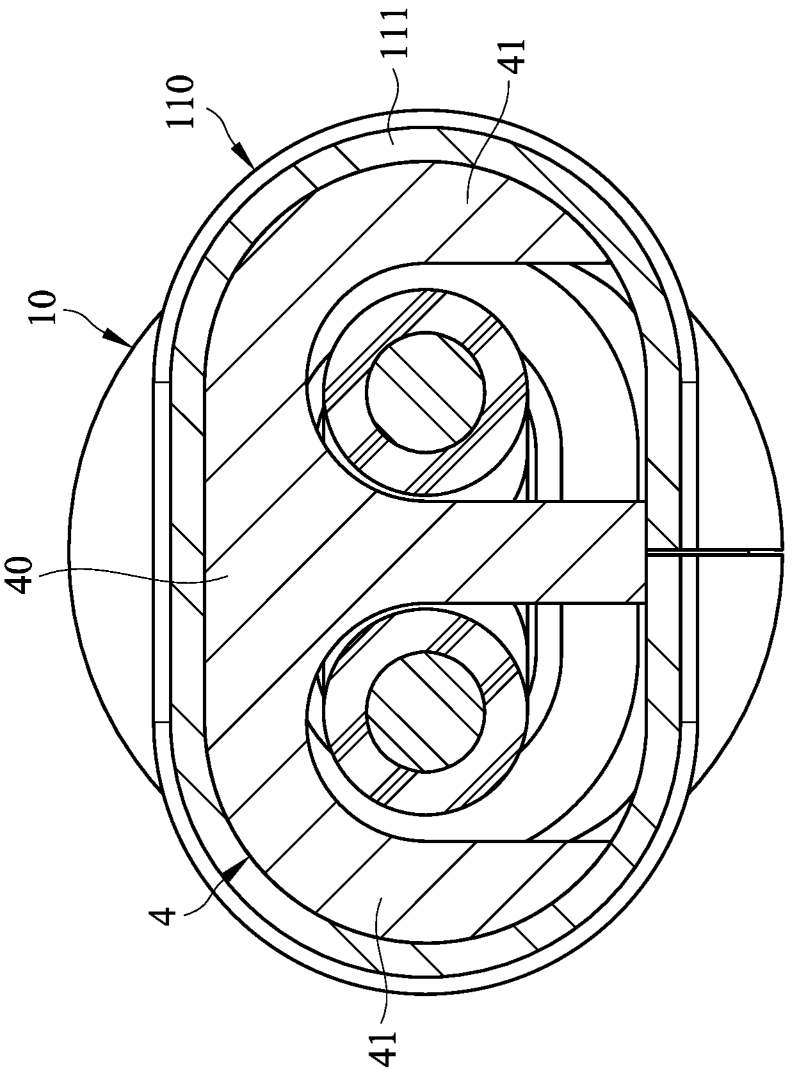
FIG. 7 is a cross-sectional view along the B-B line in FIG. 6.

With reference to FIGS. 6 and 7, a second embodiment of the cable connector in accordance with the present invention is shown and is similar to the first embodiment of the cable connector as shown in FIG. 1. In the second embodiment, an indentation ring portion 111 is formed inward on the main body 110 of the metal housing 10 corresponding to the metal shielding element 4. Since the metal shielding element 4 may be close to the sleeve end 100, the indentation ring portion 111 may be close to the sleeve end 100 and away from the plug end 120. Furthermore, as shown in FIG. 7, the indentation ring portion 111 may match the metal shielding element 4 so that a top wall and two opposite sidewalls of the indentation ring portion 111 may be respectively abutted against the top plate 40 and the two side plates 41 of the metal shielding element 4. With the foregoing description, the metal shielding element 4 is electrically connected to the metal housing 10 by abutting against the indentation ring portion 111 of the metal housing 10. Therefore, the noise signals are directed to the ground through the metal housing 10 and the outer conductor 34 is electrically connected to the metal housing 10 as shown in FIGS. 3 and 4. The efficiency of the cable connector for the high-frequency signal transmission is further improved. In one embodiment, the indentation ring portion 111 of the main body 110 may be a long-oval cylinder which is the same as that of the main body. A shape of a vertical cross-section of the indentation ring portion 111 is long-oval.

Figure 8:
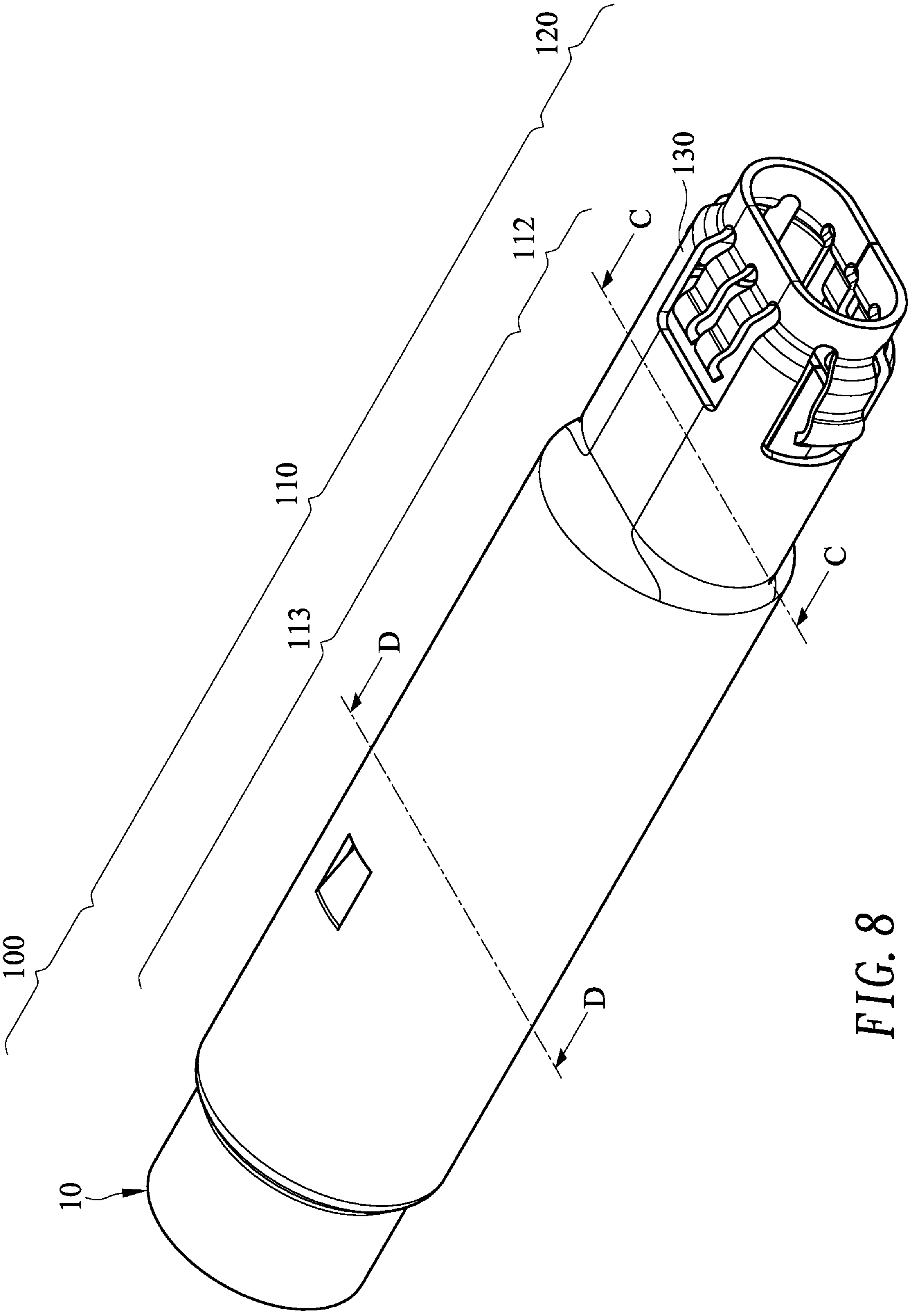
FIG. 8 is a perspective view of a metal housing of a third embodiment of a cable connector in accordance with the present invention.
Figure 9B:
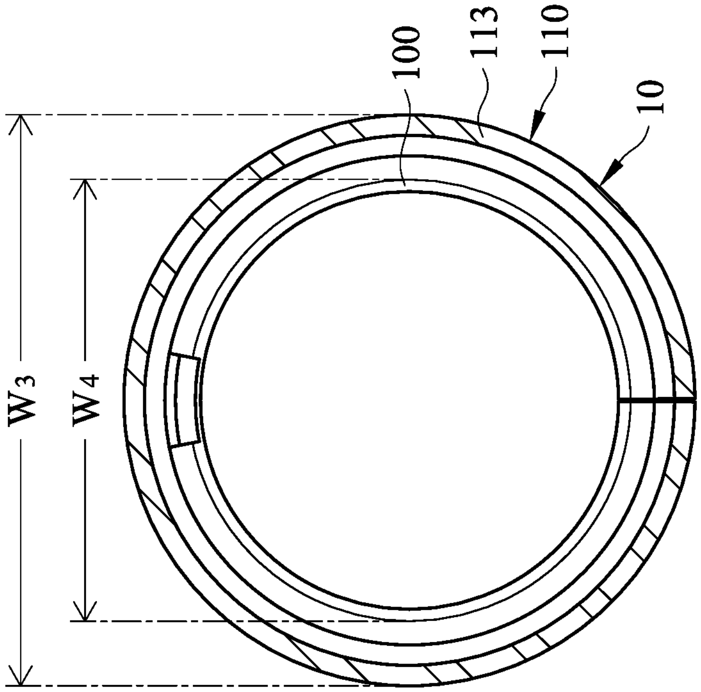
FIG. 9B is a cross-sectional view along the D-D line in FIG. 8.
Figure 9A:
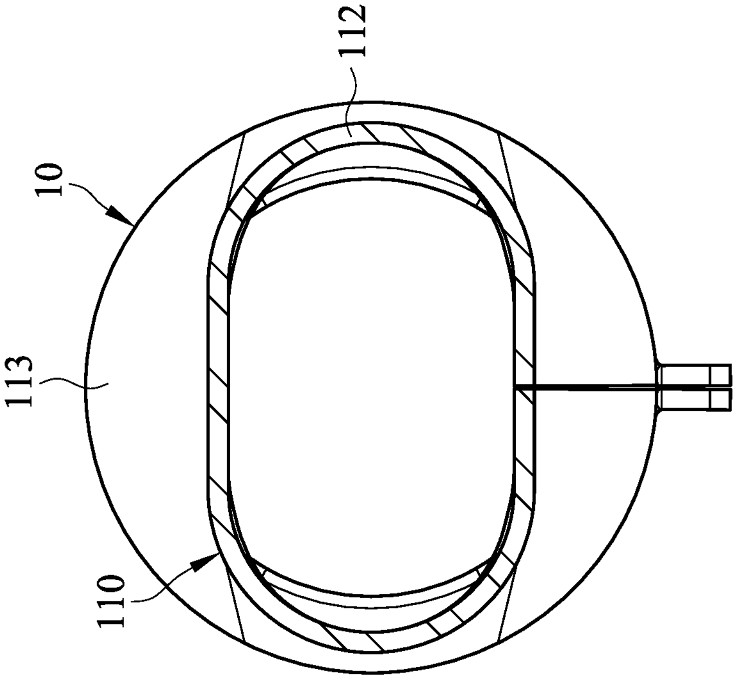
FIG. 9A is a cross-sectional view along the C-C line in FIG. 8.
Figure 10A:
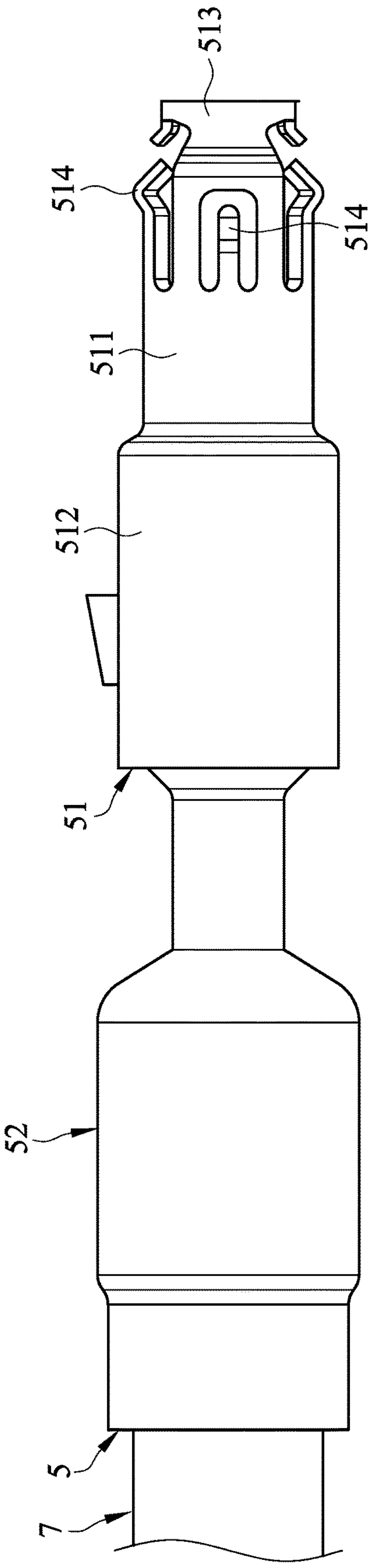
FIG. 10A (PRIOR ART)
FIG. 10A is a side plane view of a conventional cable connector.
Figure 10B:
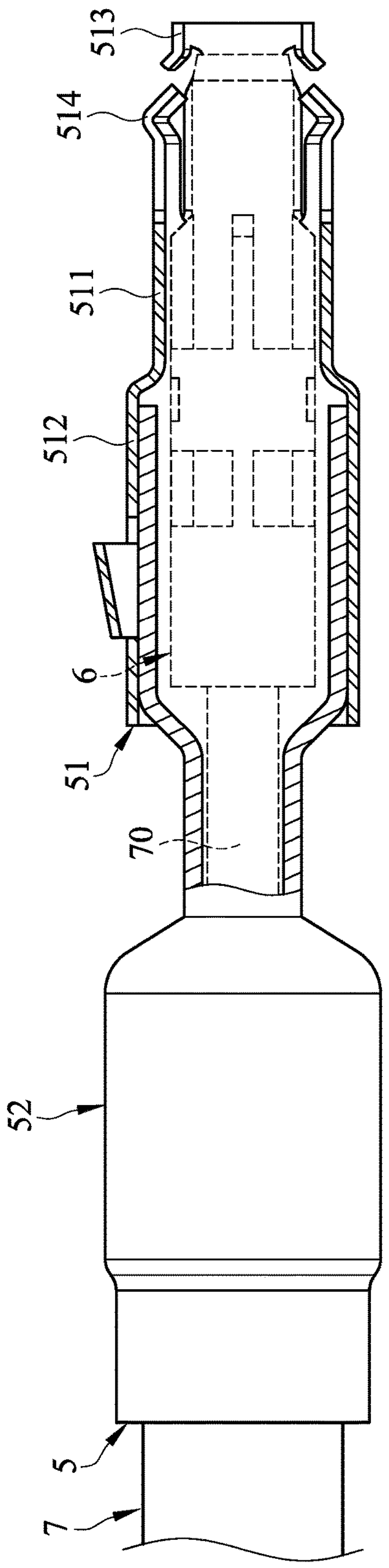
FIG. 10B (PRIOR ART)
FIG. 10B is an enlarged side view in a partial section of the conventional cable connector of FIG. 10A.

With reference to FIG. 8, a third embodiment of the cable connector in accordance with the present invention is shown and is similar to the first embodiment of the cable connector as shown in FIG. 1. Thus, only the metal housing 10 is shown in FIG. 8. In the third embodiment, the main body 110 of the metal housing 10 may further include a first ring segment 112 and a second ring segment 113. The first ring segment 112 is close to the plug end 120, and the second ring segment 113 is close to the sleeve end 100. A maximum width of the second ring segment 113 is greater than a maximum width of the first ring segment 112. In the present embodiment, a length of the first ring segment 112 may be less than a length of the second ring segment 113. As shown in FIGS. 8 and 9A, the first ring segment 112 may be a long-oval cylinder, and a shape of a vertical cross-section of the first ring segment 112 may be long-oval. The maximum width of the first ring segment 112 may match the maximum width of the plug end 120. The end body 130 of the plug end 120 may be a long-oval cylinder which is the same as that of the first ring segment 112. The maximum width of the second ring segment 113 may be greater than the maximum width of the sleeve end 100. In the present embodiment, as shown in FIGS. 8 and 9A, the second ring segment 113 may be cylindrical and the shape of a vertical cross-section of the second ring segment 113 may be circular. Therefore, the maximum width W3 of the main body is defined by an outer diameter of the second ring segment 113. In one embodiment, the maximum width W3 of the second ring segment 113 may be greater than the maximum width W4 of the sleeve end 100. In the present embodiment, the outer diameter of the second ring segment 113 may be greater than an outer diameter of the sleeve end 100.

With the foregoing description, the cable connector applies the metal housing integrally formed but not the two-piece housing in which the parts are separately manufactured. Thus, the manufacturing steps and the assembling steps are simplified. Furthermore, each elastic element of the plug end extends backward from the ring portion of the end body. The extending direction of the elastic elements is opposite to the plugging direction of the cable connector. The distal end of each elastic element is away from the ring portion. Therefore, an excessive stress generated while the plugging direction of the cable connector deviates does not act on the distal end of each elastic element. Moreover, by the metal shielding element matching with and being accommodated between the two dielectric layers of the cable and the main body and the metal housing, the external electromagnetic interference is blocked. Thus, the efficiency of the cable connector for the high-frequency signal transmission is effectively improved. Accordingly, the manufacturing process of the cable connector as described is simplified. Even if the cable connector has been plugged and unplugged many times, the metal housing does not disintegrate. Thus the deformation of the elastic elements is prevented.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A cable connector comprising:

a metal housing comprising a sleeve end, a main body, and a plug end from rear to front and integrally formed, wherein the plug end includes:

an end body having a ring portion extending forward from the end body and a plurality of holes formed through the end body; and a plurality of elastic elements respectively corresponding to the holes and integrally extending backward from the ring portion of the end body;

an insulator matchingly accommodated in the main body and the end body of the plug end of the metal housing and having two inner conductor terminals disposed through the insulator from front to rear; and a cable comprising:

an insulation jacket matchingly mounted in the sleeve end; and two inner conductors protruding from the insulation jacket and mounted in the insulator to be respectively connected to the two inner conductor terminals, wherein a maximum width of the main body of metal housing is greater than a maximum width of the sleeve end of the metal housing; and wherein a maximum width of the main body of the metal housing matches a maximum width of the plug end of the metal housing.

2. The cable connector as claimed in claim 1, wherein a first lateral distance is defined between the cable and the insulator;

a part of the two inner conductors is not mounted in the insulator at the first lateral distance;

the cable further comprises two dielectric layers disposed in the main body of the metal housing and respectively coating on the part of the two inner conductors, which is not mounted in the insulator; and a metal shielding element is matchingly accommodated in the main body of the metal housing, is located between the insulator and the cable, and comprises:

a top plate located between an upper side of the two dielectric layers and a top wall of the main body;

two side plates extending downward from two opposite sides of the top plate and respectively located between outer sides of the two dielectric layers and two opposite sidewalls of the main body; and a divider protruding downward from the top plate and located between the two dielectric layers to divide the two dielectric layers.

3. The cable connector as claimed in claim 2, wherein a second lateral distance is defined between the metal shielding element and the cable;

the two dielectric layers are side by side at the second lateral distance; and the cable further comprises:

a cable sleeve matchingly accommodated in the main body of the metal housing, located between the metal shielding element and the cable, and mounted around the two dielectric layers at the second lateral distance;

a first outer conductor, wherein the first outer conductor is located between the two dielectric layers and the insulation jacket and between the two dielectric layers and the cable sleeve;

a second outer conductor, wherein the second outer conductor is located between the cable sleeve and the main body and between the insulation jacket and the sleeve end of the metal housing, and the second outer conductor is integrally connected to the first outer conductor.

4. The cable connector as claimed in claim 3, wherein the ring portion of the plug end extends forward and inward from the end body.

5. The cable connector as claimed in claim 4, wherein each elastic element has a convex portion extending outward from the distal end of the corresponding elastic element and protruding out of the metal housing.

6. The cable connector as claimed in claim 5, wherein the convex portion of each elastic element is arc-shaped.

7. The cable connector as claimed in claim 2, wherein the metal shielding element is a zinc alloy die casting.

8. The cable connector as claimed in claim 1, wherein the sleeve end of the metal housing is cylindrical, and the maximum width of the sleeve end is defined by an outer diameter thereof;

the main body of the metal housing is a long-oval cylinder; and the end body of the plug end of the metal housing is a long-oval cylinder which is the same as that of the main body.

9. The cable connector as claimed in claim 8, wherein an indentation ring portion is formed inward on the main body of the metal housing corresponding to the metal shielding element; and a top wall and two opposite sidewalls of the indentation ring portion are respectively abutted against the top plate and the side plates of the metal shielding element.

10. The cable connector as claimed in claim 1, wherein the main body of the metal housing comprises a first ring segment close to the plug end and a second ring segment close to the sleeve end, wherein the first ring segment is a long-oval cylinder, and a maximum width of the first ring segment matches a maximum width of the sleeve end; and a maximum width of the second ring segment is greater than a maximum width of the sleeve end and a maximum width of the first ring segment.

11. The cable connector as claimed in claim 10, wherein a length of the first ring segment is less than a length of the second ring segment;

the sleeve end of the metal housing is cylindrical, and the maximum width of the sleeve end is defined by an outer diameter thereof;

the second ring segment of the main body of the metal housing is cylindrical, and a maximum width of the main body is defined by an outer diameter of the second ring segment; and the end body of the sleeve end of the metal housing is a long-oval cylinder which is the same as that of the first segment of the main body.

12. A metal housing of a cable connector comprising a sleeve end, a main body, and a plug end from rear to front and integrally formed, wherein the plug end includes:

an end body having a ring portion extending forward from the end body and a plurality of holes formed through the end body; and a plurality of elastic elements respectively corresponding to the holes and integrally extending backward from the ring portion of the end body, wherein a maximum width of the main body of metal housing is greater than a maximum width of the sleeve end of the metal housing; and wherein a maximum width of the main body of the metal housing matches a maximum width of the plug end of the metal housing.

13. The metal housing as claimed in claim 12, wherein the ring portion of the plug end extends forward and inward from the end body.

14. The metal housing as claimed in claim 13, wherein each elastic element has a convex portion extending outward from the distal end of the corresponding elastic element and protruding out of the metal housing.

15. The metal housing as claimed in claim 14, wherein the convex portion of each elastic element is arc-shaped.

16. The metal housing as claimed in claim 12, wherein the sleeve end of the metal housing is cylindrical, and the maximum width of the sleeve end is defined by an outer diameter thereof;

the main body of the metal housing is a long-oval cylinder; and the end body of the plug end of the metal housing is a long-oval cylinder which is the same as that of the main body.

17. The metal housing as claimed in claim 16, wherein an indentation ring portion is formed inward on the main body of the metal housing corresponding to the metal shielding element; and the indentation ring portion is close to the sleeve end and is away from the plug end.

18. The metal housing as claimed in claim 12, wherein the main body of the metal housing comprises a first ring segment close to the plug end and a second ring segment close to the sleeve end, wherein the first ring segment is a long-oval cylinder, and a maximum width of the first ring segment matches a maximum width of the sleeve end; and a maximum width of the second ring segment is greater than a maximum width of the sleeve end and a maximum width of the first ring segment.

19. The metal housing as claimed in claim 18, wherein a length of the first ring segment is less than a length of the second ring segment;

the sleeve end of the metal housing is cylindrical, and the maximum width of the sleeve end is defined by an outer diameter thereof;

the second ring segment of the main body of the metal housing is cylindrical, and a maximum width of the main body is defined by an outer diameter of the second ring segment; and the end body of the sleeve end of the metal housing is a long-oval cylinder which is the same as that of the first segment of the main body.

* * * * *